(12) United States Patent
Brun et al.

(10) Patent No.: US 12,334,229 B2
(45) Date of Patent: Jun. 17, 2025

(54) ARRANGEMENT FOR CHECKING DISENGAGEMENT BETWEEN A NUCLEAR REACTOR CONTROL CLUSTER AND A DRIVE ROD

(71) Applicant: Société Technique pour l'Energie Atomique, Villiers le Bacle (FR)

(72) Inventors: Michel Brun, Simiane-Collongue (FR); François Donnier, Pertuis (FR)

(73) Assignee: Société Technique pour l'Energie Atomique, Villiers le Bacle (FR)

( * ) Notice: Subject to any disclaimer, the term of this patent is extended or adjusted under 35 U.S.C. 154(b) by 455 days.

(21) Appl. No.: 17/915,597

(22) PCT Filed: Apr. 1, 2021

(86) PCT No.: PCT/EP2021/058610
§ 371 (c)(1),
(2) Date: Sep. 29, 2022

(87) PCT Pub. No.: WO2021/198417
PCT Pub. Date: Oct. 7, 2021

(65) Prior Publication Data
US 2023/0132308 A1 Apr. 27, 2023

(30) Foreign Application Priority Data
Apr. 2, 2020 (FR) .................................. 2003287

(51) Int. Cl.
*G21C 17/10* (2006.01)
*G21C 7/10* (2006.01)
*G21C 7/12* (2006.01)

(52) U.S. Cl.
CPC .............. *G21C 17/10* (2013.01); *G21C 7/10* (2013.01); *G21C 7/12* (2013.01)

(58) Field of Classification Search
CPC .......... G21C 17/10; G21C 17/12; G21C 7/10; G21C 7/12
(Continued)

(56) References Cited

U.S. PATENT DOCUMENTS

| 6,192,096 B1 * | 2/2001 | Ichikawa ............... G21C 17/12 376/258 |
| 2011/0222640 A1 * | 9/2011 | DeSantis .................. G21C 7/14 376/219 |

FOREIGN PATENT DOCUMENTS

| FR | 2746538 A1 | 9/1997 |
| FR | 2869447 A1 | 10/2005 |

OTHER PUBLICATIONS

Corresponding Search report for PCT/EP2021/058610.
Corresponding Search report for FR 2003287.

* cited by examiner

*Primary Examiner* — Jack W Keith
*Assistant Examiner* — Daniel Wasil
(74) *Attorney, Agent, or Firm* — Davidson Kappel LLC (57) ABSTRACT

A nuclear reactor control assembly includes a reactivity control device comprising a control rod cluster and a drive rod. The control rod cluster comprises an attaching head. The drive rod comprises an attaching device for connecting the drive rod to the attaching head. The attaching device is movable between a connection position and a disconnection position. The drive rod and the attaching device define an axial trough recess forming a sleeve. A checking device is used for checking separation between the control rod cluster and the drive rod. The checking device comprises a probe rod which is free to move translationally in the sleeve. A lower end of the probe rod can abut the attaching head. Relative displacement of the probe rod with respect to the (Continued)

drive rod can be used to determine whether the drive rod is separated from the control rod cluster.

11 Claims, 5 Drawing Sheets

(58) Field of Classification Search
USPC .................................................. 376/240, 258
See application file for complete search history.

ARRANGEMENT FOR CHECKING DISENGAGEMENT BETWEEN A NUCLEAR REACTOR CONTROL CLUSTER AND A DRIVE ROD

The present disclosure relates, according to a first aspect, to a control assembly designed to check the separation between a control rod cluster and a drive rod of a device for controlling the reactivity of a nuclear reactor.

More particularly, the present disclosure relates to such an assembly for a pressurized water reactor.

BACKGROUND

Pressurized Water Reactors (PWR) comprise a core including a plurality of nuclear fuel elements juxtaposed in a reactor vessel.

Such a nuclear fuel element comprises a bundle of fuel rods inserted into a support structure comprising guide tubes.

In addition to the fact that the guide tubes make it possible to provide proper rigidity to the supporting structure, same also make possible the insertion, within the nuclear fuel elements, of rods absorbing the neutrons generated by the nuclear chain reaction in the reactor core. Absorber rods are used to control the reactivity of the reactor core.

The absorber rods are connected to each other in groups and form rod cluster control assemblies—also called control rod clusters or control rods—which are movable along the axial direction. Via drive rods and control mechanisms of the reactor clusters, the clusters are moved along the axial direction so as to variably push the absorber rods into the fuel elements and hence regulate the reactivity of the nuclear reactor.

Thus, the rod cluster control assemblies are raised for increasing the reactivity of the reactor core. Conversely, same are pushed into the fuel elements for reducing the reactivity of the reactor core.

In the event of an incident, the rod cluster control assemblies are released and fall rapidly by gravity into the fuel elements in order to stop the nuclear reaction.

During reactor maintenance operations, in particular during fuel replacement operations, it is necessary to remove the upper internal equipment from the reactor vessel, i.e. all the equipment used to support and guide rod cluster control assemblies and instrumentation.

For this purpose, the drive rods are separated from the control rod clusters and then removed from the top of the reactor vessel.

A poor disconnection between the drive rod and the control rod cluster can lead to an accidental rise of the control rod cluster.

Such an occurrence has serious consequences because in the absence of sufficient absorber rods in the reactor core, the chain reaction in the reactor core is restarted.

Furthermore, a fuel element can itself attach to an upper internal equipment and be extracted from the core and hence lead to significant radiation protection problems.

In existing embodiments, the reactivity control device cannot guarantee the effective separation between the drive rod and the control rod cluster, nor to ensure that a fuel element that would remain attached to the upper internals and so not be removed. The operator performs such checks visually. However, the large amount of upper internal equipment in the reactor makes a visual checking of the separation difficult for an operator.

SUMMARY

An aim of the present disclosure is to propose a control assembly which provides a simple way to make sure that during maintenance operations, the drive rod is properly separated from the head of the control rod cluster so as to prevent an unexpected rise of the control rod cluster or even of a fuel element. It is further desirable that the disconnection check can be performed quickly when the drive rod is raised so that the reinsertion of the drive rod into the fuel element can easily be made.

To this end, the present disclosure relates to a control assembly in a nuclear reactor of the aforementioned type comprising:

a reactivity control device comprising a control rod cluster extending along an axial direction comprising an upper end including an attachment head, a drive rod extending along the axial direction, the drive rod comprising an upper end and a lower end opposite the upper end, the lower end comprising an attachment device for attaching the drive rod to the drive rod attachment head, the attachment device being movable between a connection position wherein the drive rod is rigidly attached to the attachment head of the control rod cluster, and a disconnection position wherein the drive rod is separated from the attachment head of the control rod cluster, the drive rod and the attachment device defining a through axial housing, forming a sleeve, a checking device for checking the separation between the control rod cluster and the drive rod, mating with the reactivity control device at least during a maintenance operation, the checking device comprising a probe rod received in the sleeve and mounted so as to be free in translation along the axial direction inside the sleeve, the probe rod comprising an upper end and a lower end situated opposite the upper end, the lower end of the probe rod abutting against the attachment head of the control rod cluster.

Thus, by observing the relative displacement of the probe rod with respect to the drive rod when the upper internals are withdrawn, it is possible to determine whether the separation of the drive rod from the head of the control rod cluster is actually effective. Indeed, a relative displacement which is substantially equal to zero means that the control rod cluster, or even the fuel element, and the drive rod, rise simultaneously and that the attachment device is not disconnected from the head of the control rod cluster. In contrast, a non-zero relative displacement of the probe rod with respect to the drive rod, resulting in a "retraction" of the probe rod in the drive rod, means that the drive rod attachment device is well separated from the head of the control rod cluster and that the fuel element did not stay hooked to an upper internal element, and so that the drive rod can be safely raised.

According to specific embodiments of the present disclosure, the reactivity control device comprises one or more of the features mentioned below, considered independently or according to all technically possible combinations:

the length according to the axial direction of the probe rod is greater than the length according to the axial direction of the drive rod so that in the connection position, the upper end of the probe rod protrudes from the upper end of the drive rod, the checking device further comprises a system for checking the relative displacement of the probe rod with respect to the drive rod, preferentially the relative displacement of the upper end of the probe rod with respect to the upper end of the drive rod, the checking system comprises a magnet attached to the probe rod and a magnetic switch configured for moving from an open position to a closed position in the presence of a magnetic field generated by the magnet, the checking system comprises a reflective target attached to the probe rod, an optical system comprising a video camera and a light source, the optical system being configured for moving simultaneously with the drive rod, the light source being configured for transmitting a video signal to the reflective target, where the video camera is configured for detecting the light signal reflected onto the reflective target, and/or the probe rod is graduated.

The present disclosure further relates, according to a second aspect, to a method for controlling the separation of a drive rod from a control rod cluster of a reactivity control device using a control assembly as described above, the method comprising:

disconnecting the drive rod from the attachment head of the control rod cluster, raising up the drive rod along the axial direction, checking the relative displacement of the probe rod with respect to the drive rod, stopping the raising of the drive rod if the relative displacement is substantially equal to zero.

According to advantageous embodiments, the method comprises one or more of the following features:

the drive rod is raised by a predetermined height comprised between 5 and 15 cm before checking the relative displacement of the probe rod with respect to the drive rod, the control step includes a visual inspection of the relative displacement of the probe rod by an operator or an automatic check using a checking system, and/or the checking step includes checking the relative displacement of the upper end of the probe rod with respect to the upper end of the drive rod.

BRIEF SUMMARY OF THE DRAWINGS

Other features and advantages of the present disclosure will be clear from the detailed description below which is given as a non-limiting example only, with reference to the attached figures, among which.

DETAILED DESCRIPTION

Figure 1:
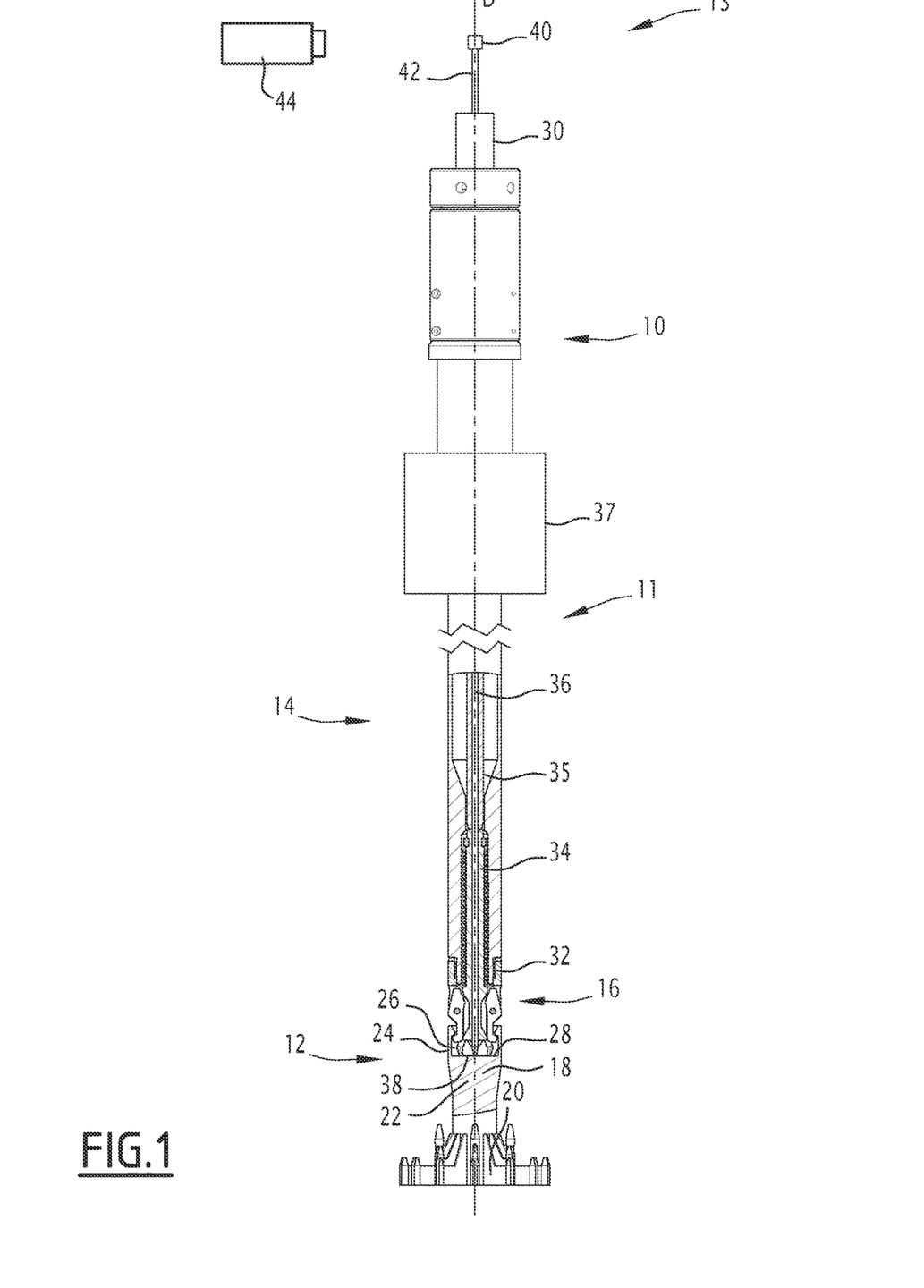
FIG. 1 is a partial axial sectional view of a control assembly according to the present disclosure wherein the attachment device is in a connection position, the probe rod protruding from the upper end of the drive rod.
Figure 2:
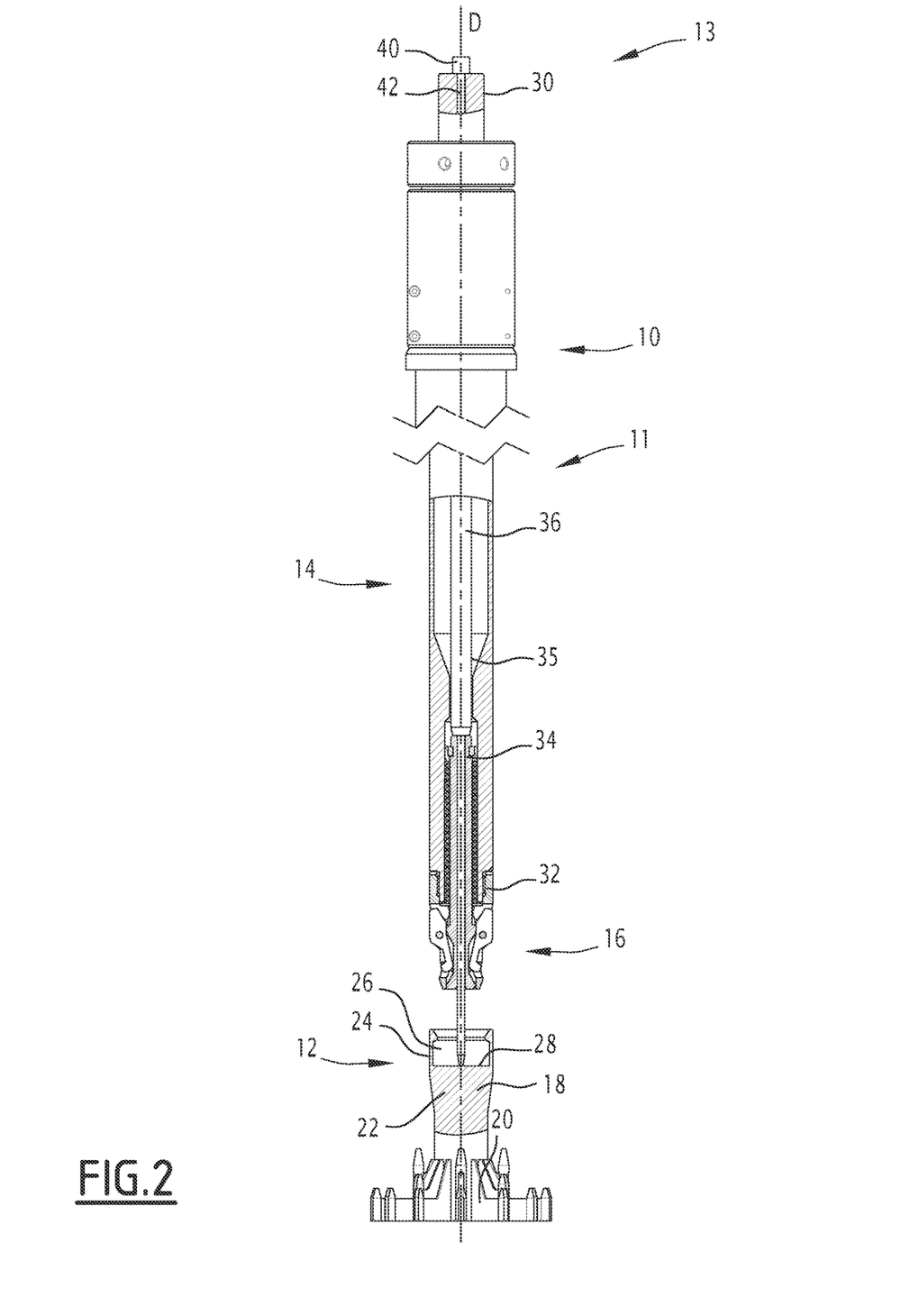
FIG. 2 is a partial axial sectional view of the control assembly shown in FIG. 1 wherein the attachment device is in a disconnection position, the drive rod being partially raised, the probe rod being retracted but still resting, in the lower part, on the head of the control rod cluster.
Figure 3:
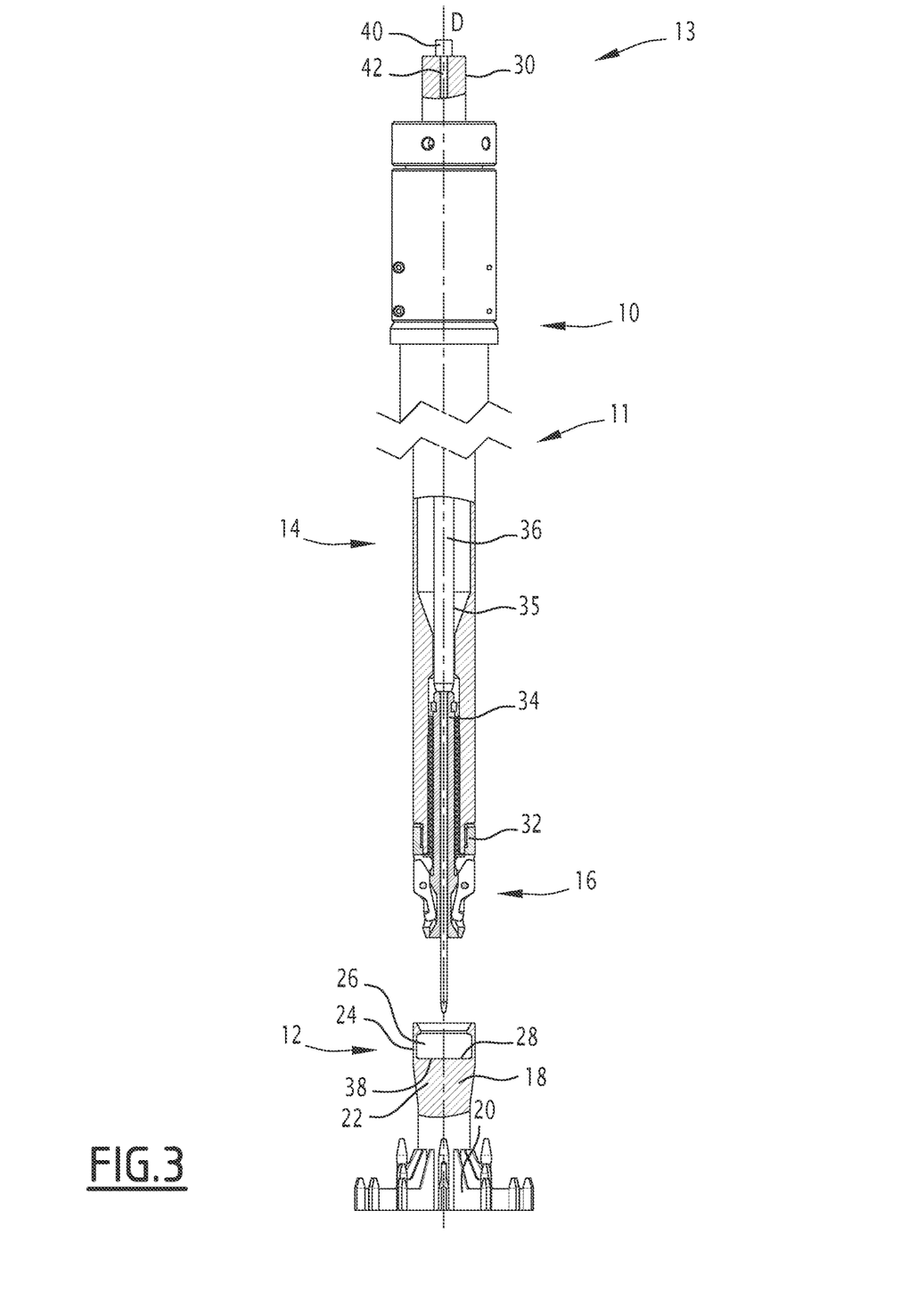
FIG. 3 is a partial axial sectional view of the assembly of FIG. 1 wherein the attachment device is in a disconnection position, the drive rod being raised, and the probe rod being retracted into the drive rod.

FIGS. 1 to 3 show a control assembly 10 for a nuclear reactor (not shown) according to the present disclosure.

Throughout the description, the terms "high", "low", "lower" and "upper" are given with respect to the axial direction D of the reactivity control device 11. The axial direction D is substantially merged with the vertical direction.

The nuclear reactor is e.g. a pressurized water nuclear reactor (PWR).

In a known manner, in this type of reactor, a nuclear reaction takes place in the core (not shown) of the reactor and releases a considerable amount of heat which is transferred to the water of a primary circuit (not shown), which is maintained at high pressure and at high temperature (about 300° C.). The water in the primary circuit transmits the heat thereof to the water of a secondary circuit (not shown) and transforms same into steam in a steam generator (not shown). Steam is then used e.g. to run a turbo-alternator unit which produces electricity.

The reactor is e.g. a small modular reactor (SMR) whose power is typically less than 300 MWe.

As a variant, the reactor is a reactor with a power greater than 300 MWe.

As a variant or in addition, the reactor is of the integrated type. In this type of reactor, the steam generator is integrated into the vessel.

The reactor comprises a vessel and a core comprising a plurality of nuclear fuel elements (not shown) juxtaposed in the reactor vessel.

Each nuclear fuel element comprises a bundle of fuel rods inserted into a support structure comprising guide tubes.

The reactor further comprises at least one control assembly 10 according to the present disclosure.

The control assembly 10 comprises a reactivity control device 11 for controlling the reactivity of the reactor core and a checking device 13 for checking the separation between the control rod cluster 12 and the drive rod 14 of the reactivity control device 11.

Preferentially, the elements of the checking device 13 form a tool directly mounted onto the reactivity control device 11 installed during the operations of removing the upper internals of the vessel or the separation of the rods 14 and the clusters 22.

In other words, the checking device 13 and the elements thereof are removable and can be placed or removed from the reactivity control device 11 by one or more operators, during maintenance operations.

Each control device 11 comprises a control rod cluster 12 extending along an axial direction D, a drive rod 14 attached in a removable manner to the control rod cluster 12 by means of an attachment device 16, and a mechanism 37 for driving the drive rod 14 in translation along the axial direction D upwards or downwards for raising or lowering the control rod cluster 14 into the fuel element and for controlling the reactivity of the core.

In the example shown in FIGS. 1 to 3, the drive mechanism 37 is located inside the vessel.

In a variant, the drive mechanism 37 is located above the closure head of the reactor vessel.

The drive mechanism 37 is automatically or manually actuated by an operator, e.g. from a control room.

The voltage drop in one of the control circuits of the drive mechanism 37 makes the control rod cluster 12 fall by gravity and thus leads to a fast shutdown of the reactor.

The drive mechanism 37 is, e.g., a step-by-step mechanism comprising an electromagnetic control, a rack and pinion device, or a screw-nut mechanism with releasable screw in the event of a power cut.

The control rod cluster 12 comprises an upper end 18 which includes a support 20 also called a "spider" and a plurality of absorber rods (not shown) attached to the support 20.

The support 20 comprises controlling head 22 mating mechanically with the drive rod 14 and more particularly with the attachment device 16.

Each absorber rod extends along a direction substantially parallel to the axial direction D.

The control rod cluster 12 e.g. comprises between eight and thirty-six absorber rods, e.g. twenty-four absorber rods.

Each absorber rod is e.g. made of a silver-indium-cadmium alloy, or of boron carbide or stainless steel.

Preferentially, the support 20 comprises a socket 24 defining an opening and a receiving volume 26 which receives the attachment device 16 of the drive rod 14.

The receiving volume 26 comprises a lower surface 28, preferentially substantially flat, opposite the opening.

The drive rod 14 extends along the axial direction D.

The drive rod 14 comprises an upper end 30 and a lower end 32 located opposite the upper end 30 along the axial direction D.

The lower end 32 comprises the attachment device 16 for attaching the drive rod 14 to the attachment head 22 of the control rod cluster 12.

The attachment device 16 can be moved between a connection position (FIG. 1) wherein the drive rod 14 is rigidly attached to the attachment head 22 of the control rod cluster 12, and a disconnection position (FIGS. 2 and 3) wherein the drive rod 14 is separated from the attachment head 22 of the control rod cluster 12.

During normal reactor operation, the attachment device 16 is in the connection position so that a displacement along the axial direction D of the drive rod 14 by the drive mechanism 37 entails the displacement of the control rod cluster 12 and consequently of the absorber rods.

During maintenance operations, e.g., it may be necessary to raise the drive rod 14 independently of the control rod cluster 12, in particular for removing the upper internal equipment.

The upper internal equipment is the equipment placed inside the reactor vessel and used to support and guide the fuel elements, the control rod clusters 12 and the instrumentation.

The attachment device 16 is then placed in the disconnection position so that when the operation of removing the upper internals is correctly performed, the displacement of the drive rod 14 does not entail the simultaneous displacement of the control rod cluster 12. In other words, in the disconnection position, the drive rod 14 can move independently of the control rod cluster 12.

The attachment device 16 is e.g. a pawl attachment device known in the prior art.

As a variant, the attachment device 16 is of any type.

According to the present disclosure, the drive rod 14 and the attachment device 16 define a through axial housing 34 forming a sleeve 35. In other words, the sleeve 35 opens into the upper end 30 of the drive rod 14 and passes through the attachment device 16 and opens outwards under the attachment device 16.

The checking device 13 for checking the separation between the control rod cluster 12 and the drive rod 14 comprises a probe rod 36 received in the sleeve 35 and mounted free to move in translation along the axial direction D in the sleeve 35.

The diameter of the probe rod 36 e.g. is comprised between 2 mm and 10 mm.

The length of the probe rod 36 e.g., as measured along the axial direction D, exceeds the length of the drive rod 14 by a length of 5 cm to 15 cm.

The probe rod 36 is preferentially made of metal, e.g. stainless steel.

The probe rod 36 comprises a lower end 38 and an upper end 40 opposite the lower end 38.

The lower end 38 abuts against the attachment head 22 of the control rod cluster 12 and more particularly abuts against the lower surface 28 of the receiving volume 26 of the attachment head 22 of the control rod cluster 12. The lower end 38 therefore crosses through the lower opening of the sleeve 35 which leads outwards under the attachment device 16.

More particularly, the lower end 38 abuts against the lower surface 28 of the receiving volume 26 of the socket 24 of the control rod cluster 20.

Preferentially, the length of the probe rod 36 is dimensioned so that, in the connection position, the upper end 40 of the probe rod 36 protrudes beyond the upper end 30 of the drive rod 14, outside the sleeve 35, by a height comprised between 5 cm and 15 cm, e.g. 7.2 cm.

In other words, the probe rod 36 preferentially has an axial length greater than the axial length of the sleeve 35.

Thus, by observing the relative displacement of the upper end 40 of the probe rod 36 with respect to the upper end 30 of the drive rod 14, it is possible to determine whether the separation of the drive rod 14 from the attachment head 22 of the control rod cluster 12 is indeed effective. In fact, a relative displacement substantially equal to zero means that the control rod cluster 12 and the drive rod 14 rise simultaneously. In contrast, a non-zero relative displacement of the upper end 40 of the probe rod 36 with respect to the upper end 30 of the drive rod 14, resulting in a "retraction" of the probe rod 36 inside the sleeve 35, means that the attachment device 16 of the drive rod 14 is separated from the attachment head 22 of the control rod cluster 12 (FIGS. 2 and 3).

Similarly, if the fuel element were carried along during the retraction of the drive rod 14, the cluster would be driven along with same and the relative displacement of the probe rod would be substantially equal to zero. Such event would therefore also be identified.

Advantageously, the outer wall 42 of the probe rod 36 is graduated or includes at least one mark. In this way, the operator can more easily visually check the relative displacement of the upper end 40 of the probe rod 36 with respect to the upper end 30 of the drive rod 14.

Figure 4:
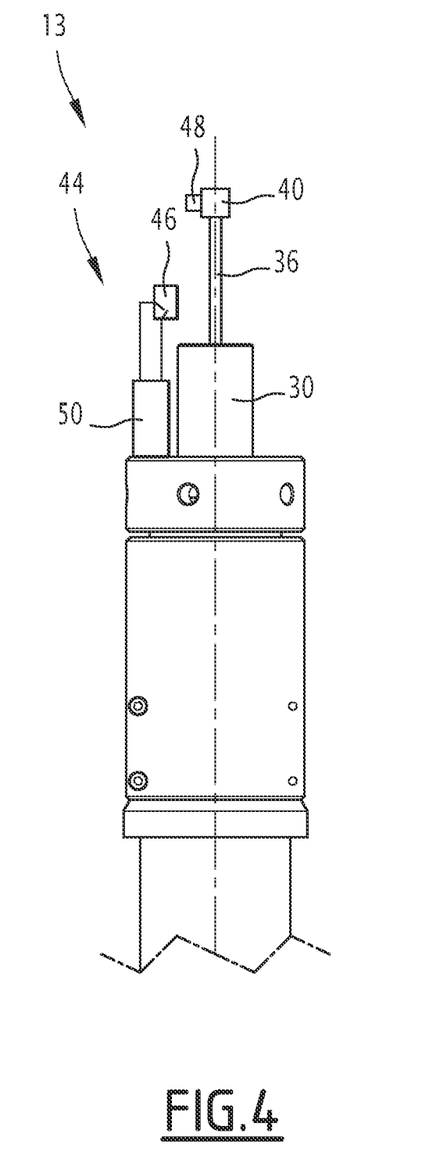
FIG. 4 is a schematic axial sectional view of the upper part of the drive rod and of a first system for controlling the relative displacement of the probe rod with respect to the drive rod.
Figure 5:
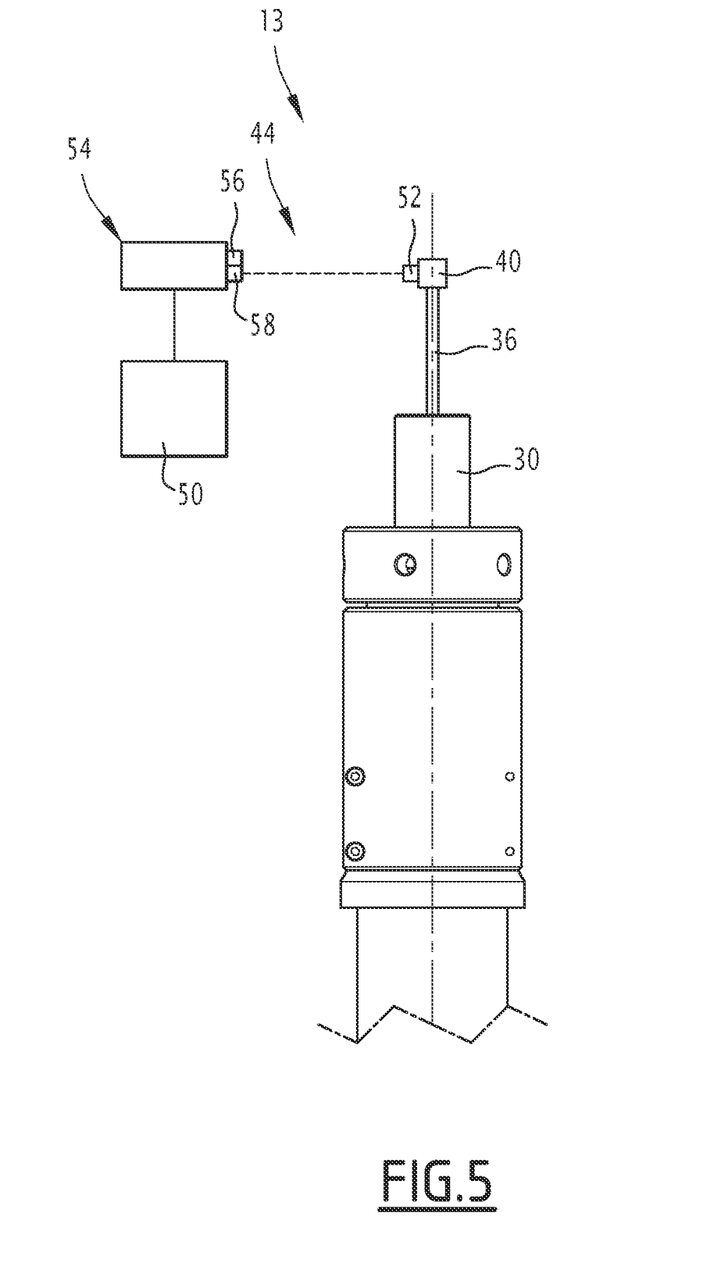
FIG. 5 is a schematic axial sectional view of the upper part of the drive rod and of a second system for checking the relative displacement of the probe rod with respect to the drive rod.

In a variant or in addition, the checking device 13 further comprises a checking system 44 for checking the relative displacement of the probe rod 36 with respect to the drive rod 14, and more particularly of the upper end 40 of the probe rod 36 with respect to the upper end 30 of the drive rod 14.

The checking system 44 e.g. comprises a magnetic switch preferentially attached to the upper end 40 of the drive rod 14 and a magnet 48 attached to the probe rod 36.

The magnetic switch 46 is, e.g., a reed switch 46 comprising two magnetized contacts which, in the presence of a magnetic field, magnetize by influence, are attracted to each other, touch each other and establish an electrical contact. Conversely, when the magnetic field ceases, the magnetization between the two contacts ceases and the two contacts move away from each other.

The magnetic switch 46 is thus configured for moving from an open position to a closed position in the presence of a magnetic field, and from the closed position to the open position in the absence of the magnetic field.

Thus, the passage of the magnet 48 in front of the magnetic switch 46 leads to the closing of the switch 46, making possible the detection of the displacement of the probe rod 36 with respect to the drive rod 14.

The switch 46 is e.g. connected to a signaling device 50 configured for alerting an operator about the closing of the switch 46.

In a variant, the checking system 44 comprises a reflective target 52 attached to the probe rod 36, preferentially to the end 40 of the probe rod 36, and an optical device 54 which includes a video camera 56 coupled to a light source 58, arranged at a distance from the probe rod 36.

The optical device 54 is configured for moving in translation along the direction D simultaneously with the drive rod 14, during the retraction of the drive rod 14.

The light source 58 is, e.g., a laser source.

The light source 58 is configured for emitting a light ray toward the reflective target 52.

The video camera 56 is configured for detecting the light ray reflected onto the reflective target 52.

The absence of detection of a reflected light ray indicates a relative displacement of the probe rod 36 with respect to the drive rod 14.

The video camera 56 is e.g. connected to a signaling device 50 configured for alerting an operator in the absence of a reflected light ray.

A method of controlling the separation of a drive rod 14 from a control rod cluster 12 of a reactivity control device 11 according to the present disclosure as described above, will now be described.

The method first comprises a step of disconnecting the drive rod 14 from the attachment head 22 of the control rod cluster 12.

During such step, the attachment device 16 is moved from the connection position to the disconnection position.

During the next step, the upper internals carrying the drive rod(s) 14 are raised upwards along the axial direction D.

The drive rod 14 is raised upwards along the axial direction D.

The method then comprises the check of the relative displacement of the probe rod 36 with respect to the drive rod 14.

Preferably, such step comprises the check of the relative displacement of the upper end 40 of the probe rod 36 with respect to the upper end 30 of the drive rod 14.

The check is performed, e.g., visually by an operator or automatically by using a displacement checking system 44.

The method then comprises stopping the raising of the drive rod 14 if the relative displacement is substantially equal to zero.

In fact, a substantially equal zero relative displacement between the probe rod 36 and the drive rod 14 means that the drive rod 14 leads to, during the upward displacement thereof, the rise of the control rod cluster 12 as a result of a poor disconnection of the attachment device 16.

Conversely, a non-zero relative displacement between the probe rod 36 and the drive rod 14 means that the drive rod 14 is indeed well disconnected from the control rod cluster 12. More particularly, at the upper end 30 of the drive rod 14, the probe rod 36 seems to "disappear" into the drive rod 14.

In other words, the distance between the upper end 40 of the probe rod 36 and the upper end 30 of the drive rod 14 decreases during the raising of the drive rod 14 when the attachment device 16 is correctly disconnected from the control rod cluster 12.

Preferentially, the method comprises a step consisting of raising the drive rod 14 by a predetermined height before performing the check of the relative displacement between the probe rod 36 and the drive rod 14.

The predetermined height is comprised between 5 cm and 15 cm, e.g. 7.2 cm.

Preferentially, the predetermined height is chosen so that in the event of poor disconnection of the attachment device 16 from the control rod cluster 12, the drive rod 14 can be lowered back into the fuel element and the absorber rods can be repositioned in the geometry of the core, before the control rod cluster 12 can do any damage.

Thus, the control assembly 10 according to the present disclosure is particularly advantageous because same can be used to make sure that the disconnection between the attachment device 16 and the attachment head 22 of the control rod cluster 12 is indeed effective, preventing an unexpected rise of the control rod cluster 12 and potentially of a fuel element that would cling to the control rod cluster 12 or to a higher internal element.

What is claimed is:

1. A control assembly for a nuclear reactor, the control assembly comprising:
    a reactivity control device comprising:
        a control rod cluster extending along an axial direction comprising an upper end which includes an attachment head; and
        a drive rod extending along the axial direction, the drive rod comprising an upper end and a lower end located opposite the upper end, the lower end including an attachment device for attaching the drive rod to the attachment head of the control rod cluster, the attachment device being movable between a connection position wherein the drive rod is rigidly attached to the attachment head of the control rod cluster, and a disconnection position wherein the drive rod is separated from the attachment head of the control rod cluster, the drive rod and the attachment device defining a through axial housing forming a sleeve; and
    a checking device for checking a separation between the control rod cluster and the drive rod, the checking device is configured to mate with the reactivity control device, the checking device comprising a probe rod received inside the sleeve and mounted free in translation along the axial direction in the sleeve, the probe rod comprising an upper end and a lower end located opposite the upper end, the lower end of the probe rod is arranged to abut against the attachment head of the control rod cluster.

2. The control assembly according to claim 1, wherein a length of the axial direction of the probe rod is greater than a length of the axial direction of the drive rod so that in the connection position, the upper end of the probe rod protrudes from the upper end of the drive rod.

3. The control assembly according to claim 1, wherein the checking device further comprises a checking system for checking a relative displacement of the probe rod with respect to the drive rod.

4. The control assembly according to claim 3, wherein the checking device is intended to check the relative displacement of the upper end of the probe rod with respect to the upper end of the drive rod.

5. The control assembly according to claim 3, wherein the checking system comprises a magnet attached to the probe rod and a magnetic switch configured to move from an open position to a closed position in a presence of a magnetic field generated by the magnet.

6. The control assembly according to claim 3, wherein the checking system comprises a reflective target attached to the probe rod, an optical system comprising a video camera and a light source, the optical system being configured for moving simultaneously with the drive rod, the light source being configured for transmitting a video signal to the reflective target, and the video camera being configured for detecting the video signal reflected onto the reflective target.

7. The control assembly according to claim 1, wherein the probe rod is graduated.

8. A method for controlling the separation of a drive rod from a control rod cluster of a reactivity control device using the control assembly according to claim 1, the method comprising:
  disconnecting the drive rod from the attachment head of the control rod cluster;
  raising up the drive rod along the axial direction;
  checking a relative displacement of the probe rod with respect to the drive rod; and
  stopping the raising of the drive rod if the relative displacement is equal to zero.

9. The method according to claim 8, wherein the drive rod is raised by a predetermined height comprised between 5 and 15 cm prior to checking the relative displacement of the probe rod with respect to the drive rod.

10. The control method according to claim 8, wherein the checking step comprises a visual check of the relative displacement of the probe rod by an operator or an automatic check using a checking system.

11. The control method according to claim 8, wherein the checking step comprises checking the relative displacement of the upper end of the probe rod with respect to the upper end of the drive rod.

* * * * *